Oct. 30, 1928.
W. J. HOY
1,689,588
SAFETY DEVICE FOR TRANSPORTING FRAGILE ARTICLES
Filed Oct. 23, 1926
2 Sheets-Sheet 1
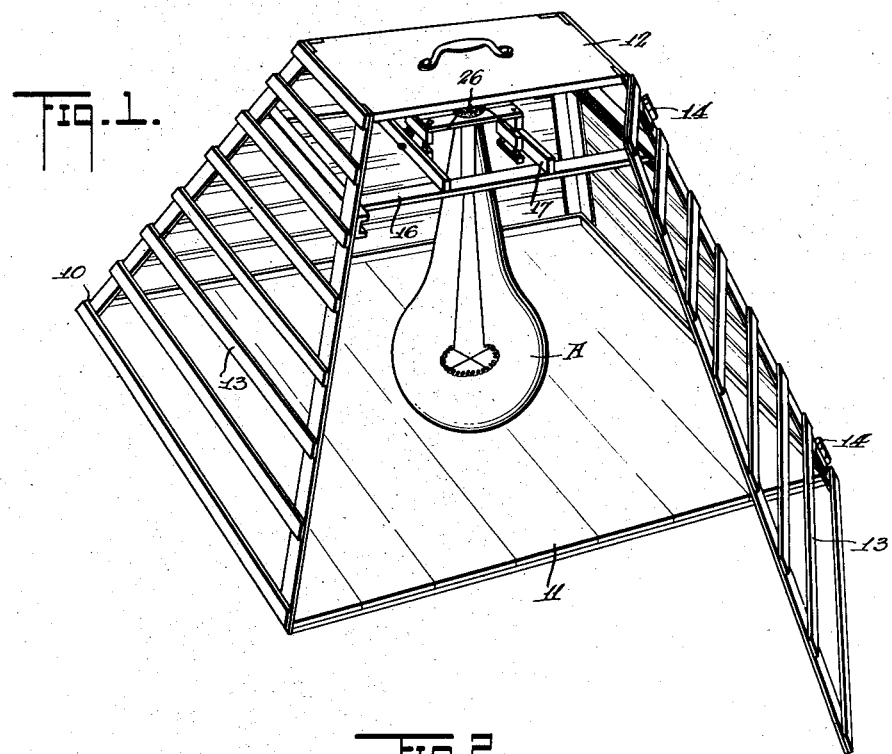
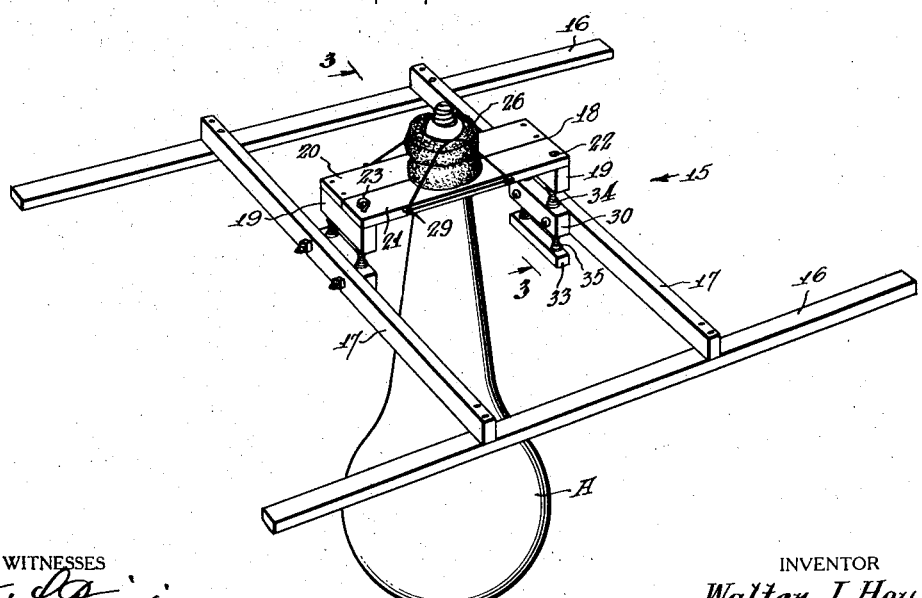
WITNESSES
INVENTOR
Walter J. Hoy.
BY
ATTORNEYS Oct. 30, 1928.
W. J. HOY
1,689,588
SAFETY DEVICE FOR TRANSPORTING FRAGILE ARTICLES
Filed Oct. 23, 1926    2 Sheets-Sheet 2
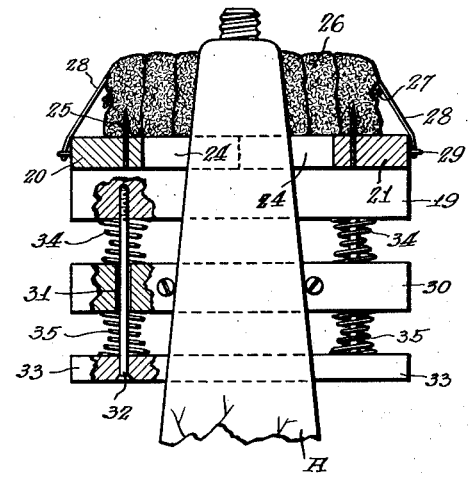
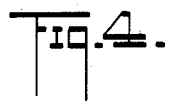
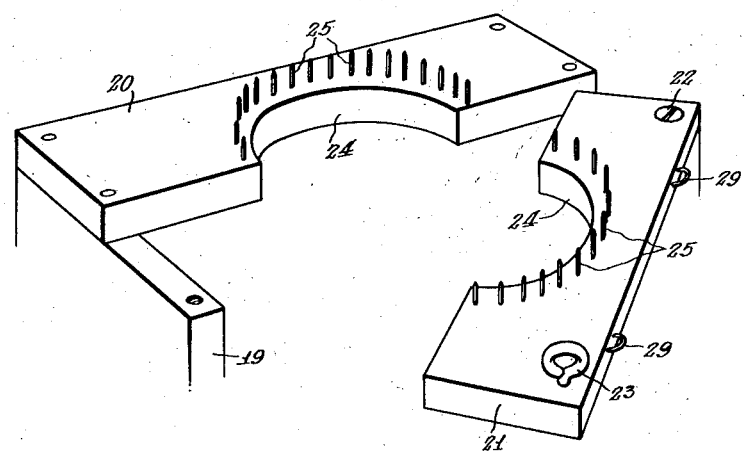
WITNESSES
INVENTOR
*Walter J. Hoy.*
BY
ATTORNEYS Patented Oct. 30, 1928.

1,689,588

UNITED STATES PATENT OFFICE.

WALTER J. HOY, OF WOODSIDE, NEW YORK, N. Y.

SAFETY DEVICE FOR TRANSPORTING FRAGILE ARTICLES.

Application filed October 23, 1926. Serial No. 143,669.

This invention relates to devices for transporting fragile articles and comprehends a means for supporting the articles within a suitable container to protect said articles particularly against horizontal and vertical shocks.

In the transportation of vacuum tubes, such as X-ray, violet-ray, radio broadcasting, rectifier or mercury arc vacuum tubes, as well as large incandescent lamps, considerable breakage occurs due to the present methods of packing, entailing not only expense to the transportation companies and delay to the receivers of the goods, but in many instances causing irreparable damage to the articles being transported irrespective of the care with which they are handled. In order to overcome this, the present invention comprehends a means for suspending the articles from an overhead support to allow for a universal swinging movement in a substantially horizontal plane so that horizontal shocks such as the sudden stopping or starting of a transporting vehicle are compensated for.

The invention further comprehends a suspension mounting in which means is afforded to compensate for vertical shocks and jars incident to travel over an uneven road-bed.

The invention further aims to provide a cushioned means of connection between the suspension device and the article to afford protection at the points of contact with the article.

As a still further object the invention comprehends a safety device for protecting articles in transit, which is comparatively simple in its construction and mode of use, which is comparatively inexpensive and economical to produce and which is thoroughly reliable and highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of a crate equipped with a supporting means constructed in accordance with the invention and illustrating the article in place;

Fig. 2 is a similar view of the suspension means with the article applied thereto, said suspension means being removed from the crate;

Fig. 3 is an enlarged detail sectional view taken approximately on the line 3—3 of Fig. 2 and illustrating broadly the attaching means or girdle;

Fig. 4 is a fragmentary perspective view of the suspension means in open condition for applying or removing the article and its girdle.

Referring to the drawings by characters of reference, 10 designates generally a crate which is preferably provided with a solid base or floor 11 and a solid top or cover 12, the latter being of substantially lesser area than the former and connected by slatted inclining and converging side walls 13, one of which is hinged at 14 or otherwise connected to permit of the opening thereof to gain access to the interior. Removably mounted in any suitable manner in the upper restricted portion of the crate is a mounting generally indicated by the reference character 15 which consists of pairs of cross bars 16—16 and 17—17 defining a framework which is insertable through or removable from the open side of the crate 10. The framework supports a bridge 18 which is composed of end cleats 19 joined by a stationary cross piece 20 rigidly attached to the cleats, a mating cross piece 21 being hingedly attached at 22 to one of the cleats 19 for swinging movement from a closed to an open relation with respect to the stationary cross piece or vice versa. A suitable retaining means for holding the cross pieces 20 and 21 in a closed relation, such as a set screw 23, is provided. The cross pieces are provided with mating substantially semi-circular notches 24 on their inner confronting faces and the cross pieces adjacent the notches are formed with a series of upstanding pins or tines 25 adjacent the edges of the cross pieces defining the notches.

The article A which is to be supported is wrapped or embraced by a suitable girdle 26 adjacent its upper end, which girdle preferably consists of a spongy resilient or elastic material such as a strip of sponge rubber spirally wound about the upper end or neck of the article and bound in place by a cord 27 or its equivalent. The pad or girdle 26 is designed to form an enlargement of a sufficient diameter to engage or seat upon the upper faces of the cross pieces 20 and 21 so that the neck or upper end of the article A is centered within the opening defined by the notches 24, the pins or tines 25 being anchored in the girdle or pad to prevent lateral displacement. In order to retain the girdle seated on the cross pieces 20 and 21 and engaged with the pins or tines 25, a sling, such as a cord or cords 28, is passed through guides 29 on the outer side edges of the cross pieces 20 and 21 and is engaged over the pad or girdle 26, which pad or girdle due to its resiliency allows for a substantially universal swinging movement of the article A in a substantially horizontal plane. This arrangement compensates for horizontal shocks or jars due to the sudden stopping and starting of a transporting vehicle and the shape of the crate is such as to allow for ample swinging movement of the article. In order to cushion the article-supporting means against vertical shocks, the cleats 19 are tensioned against vertical movement by a mounting which consists of bearing strips 30 underlying the same and attached to the inner faces of the cross bars 17 through which bearing strips apertures 31 are formed. Vertical depending stems 32 from the cleats 19 extend through the apertures 31 and are connected to subterposed cleats 33 while coiled expansion springs 34 and 35 are interposed respectively between the cleats 19 and the upper and lower faces of the bearing strips 30.

What is claimed is:

1. A transporting container for fragile articles including means for suspending the articles within the container for universal swinging movements in a substantially horizontal plane, said suspension means including an apertured frame, a yieldable resilient article-embracing girdle secured to the upper portion of the article and presenting an enlargement of greater diameter than the aperture in the frame adapted to seat upon the frame, and means for preventing upward or lateral displacement of the enlargement with respect to the frame whereby to maintain the article centered in the aperture.

2. A transporting container for fragile articles, including a suspension means removably mounted in the container for suspending the articles for universal swinging movements in a substantially horizontal plane, said suspension means comprising a frame, a bridge carried by the frame and tensioned against vertical movement, the said bridge including relative separable jaws having notched confronting edges defining an aperture when closed, a yieldable resilient embracing girdle attached to the upper portion of the article, said girdle defining an enlargement of greater diameter than said upper portion of the article, and means for lashing said girdle in seated position upon the bridge with the article centered in the aperture whereby the article is suspended for free universal swinging movements in a substantially horizontal plane.

3. A transporting container for fragile articles including means for suspending the articles within the container for universal swinging movements in a substantially horizontal plane, said suspension means including an apertured supporting element, an article-embracing girdle secured to the upper portion of the article and presenting an enlargement of greater diameter than the apertured supporting element and adapted to seat upon said supporting element, and means for preventing upward or lateral displacement of the enlargement with respect to the supporting element.

4. A transportation container for fragile articles, including a suspension means removably mounted in the container for suspending the articles for universal swinging movements in a substantially horizontal plane, said suspension means including a frame, an apertured element carried by the frame, an embracing girdle attached to the upper portion of the article, defining an enlargement of greater diameter than the upper portion of the article and seated upon the apertured element, and means for lashing the girdle in seated position upon said element whereby the article is suspended for pendulous movement controlled in all directions at the point of suspension only.

5. A device for suspending fragile articles of the character specified within a transporting container, including an enlargement on said article between its ends and a supporting element upon which the lower surface of the enlargement seats in substantially the same plane with the upper surface of the supporting element whereby the article is suspended for pendulous movement controlled in all directions at the point of suspension only.

6. A device for suspending fragile articles of the character specified within a transporting container, including an enlargement on said article between its ends and a supporting element upon which the lower surface of the enlargement seats in substantially the same plane with the upper surface of the supporting element whereby the article is suspended for pendulous movement controlled in all directions at the point of suspension only, with a free and clear space afforded for movement of the upper and lower ends of the article above and below the supporting element.

7. A device for suspending fragile articles of the character specified within a transporting container, including a yieldable resilient girdle carried by said article between its ends and a supporting element upon which the lower surface of the girdle is seated in substantially the same plane with the upper surface of the supporting element whereby the article is suspended for pendulous movement controlled in all directions at the point of suspension only with a free and clear space afforded for movement of the upper and lower ends of the article above and below the supporting element.

8. Means for supporting a fragile article in a transporting container, including an enlargement on said article and an apertured supporting element through which said article extends vertically and upon which the enlargement is seated whereby the article is suspended for pendulous movement controlled in all directions at the point of suspension only to afford a free and clear space for movement of the upper and lower ends of the article above and below the supporting element.

9. A device for supporting fragile articles of the character specified within a transporting container, including an enlargement on said article between its ends and a supporting element against which one surface of the enlargement seats in substantially the same plane with the confronting surface of the supporting element whereby the article is supported for universal swinging movement controlled in all directions at the point of support only.

10. Means for supporting a fragile article in a transporting container including an enlargement on said article and an apertured supporting element through which said article extends and against which the enlargement is seated whereby the article is supported for universal swinging movement controlled in all directions at the point of support only to afford a free and clear space for movement of the ends of the article on opposite sides of the supporting element.

WALTER J. HOY.